United States Patent [19]
Shimada et al.

[11] Patent Number: 5,425,836
[45] Date of Patent: Jun. 20, 1995

[54] DIE FOR BONDING A PADDING TO A COVERING MEMBER IN A VEHICLE SEAT

[75] Inventors: Makoto Shimada; Hideki Kamata, both of Akishima, Japan

[73] Assignee: Tachi-S, Co., Ltd., Tokyo, Japan

[21] Appl. No.: 209,968

[22] Filed: Mar. 11, 1994

[51] Int. Cl.⁶ .............................................. B30B 9/00
[52] U.S. Cl. .................................... 156/475; 156/212; 156/213; 156/580; 297/DIG. 1
[58] Field of Search ............... 156/475, 212, 213, 214, 156/580, 477.1, 494; 100/232; 297/DIG. 1, DIG. 2; 425/457, DIG. 29

[56] References Cited

U.S. PATENT DOCUMENTS

| | | | |
|---|---|---|---|
| 2,937,689 | 5/1960 | Peterson | 156/216 |
| 4,854,997 | 8/1989 | Shimada | 156/245 |
| 4,905,360 | 3/1990 | Makino | 29/91.5 |
| 4,968,376 | 11/1990 | Shimada | 156/475 |

FOREIGN PATENT DOCUMENTS

| | | |
|---|---|---|
| 59-31124 | 2/1984 | Japan . |
| 63-132715 | 8/1988 | Japan . |
| 366733 | 6/1991 | Japan . |

*Primary Examiner*—Michele K. Yoder
*Attorney, Agent, or Firm*—Oldham, Oldham, & Wilson, Co.

[57] ABSTRACT

A die for pressingly bonding a foam padding to a covering member of assemblage of a vehicle seat, the foam padding being of a one-side-opened type having a hollow therein, which die includes an upper die comprising a main die portion and a movable die member connected hingedly thereto. The movability of such die member allows easy securement of the foam padding to the upper die, as the movable die member is easily inserted into the hollow of the padding, thereby allowing further insertion of the upper die on the whole into within the padding. When pressing the padding against the covering member by use of the upper die, the movable die member is moved within the padding to a position on the same horizontal line with the main die portion, giving a pressure evenly both padding and covering member for effective bonding of them.

8 Claims, 3 Drawing Sheets

DIE FOR BONDING A PADDING TO A COVERING MEMBER IN A VEHICLE SEAT

BACKGROUND OF INVENTION

1. Field of the Invention

The present invention relates to a pressing die for use in bonding a covering member to a preformed foam padding (or foam cushion member) in order to produce a vehicle seat. In particular, the invention is directed to a die for pressingly bonding to a covering member the outer surfaces of a foam padding of a one-side-opened type having a hollow therein, for the seat assemblage.

2. Description of Prior Art

FIG. 1 shows a typical one-side-opened and hollow type of foam padding (A) (or foam cushion member) which forms one constituent element for a seat back of a vehicle seat to be produced. This sort of foam padding is preformed, as shown, in a configuration conforming to a desired outer shape of vehicle-seat seat back, which has an opened area (O) defined at its rearward side and an inner hollow areas (X1)(X2)(X3) formed therein.

In general, the foam padding (A) comprises a body portion or frontal wall portion (10) corresponding to a frontal surface of vehicle seat on which a passenger's back rests, four lateral wall portions (12a)(12b)(12c)(12d) extending rearwardly of the frontal wall portion (10), three rearward wall portions (11A)(11B)(11C) extending from their respective lateral wall portions (12a)(12b)(12c)(12d) in a direction inwardly of the padding (A) and generally in parallel with the frontal wall portion (10), terminating substantially in U-shaped edges which define the foregoing opened area (O), and a bendable wall portion (13) projected from the forth or lower lateral wall portion (12d) which faces oppositely towards the first or upper lateral wall portion (12a). All of those portions are preformed integrally together in a predetermined foaming process, using a mold. Thus, as viewed from FIG. 1, it is seen that upper inner area of the padding (A') is surrounded by all the frontal, lateral and rearward wall portions (10, 11A, 11B, 11C, 12A, 12B, . . . ) and thereby provided with an upper hollow area (X1), and that further, a pair of lateral hollow areas (X2)(X3) are defined in both lateral sides of the padding body, respectively, by the corresponding right and left lateral wall portions (12b)(12c) and corresponding right and left rearward wall portions (11B)(11C) in cooperation with the frontal wall portion (10).

Conventionally, in this construction of padding (A), a pair of spaced-apart slits (Y)(Y) are formed by cutting the upper rearward wall portion (11A) in the vertical direction of the padding body, for a purpose to be set forth hereinafter.

FIG. 2 shows a conventional pressure bonding operation, using a conventional plate-like upper pressing die (1A) and a lower die (4) having a working die surface whose shape conforms to that of the frontal surfaces of the foregoing foam padding (A), in order to pressingly bond that padding (A) with two slits (Y)(Y) to a covering member (B) which forms a covering surface of vehicle seat.

The upper pressing die (1A) is fixed to a hydraulic cylinder (5) and may be moved vertically, by operating the cylinder (6), towards and away from the lower die (4). Such pressing die (1A) is formed in a dimensions substantially equal to that of a whole hollow volume which are defined in the padding (A) by the inner back area of the frontal wall portion (10) and the above-stated three hollow areas (X1)(X2)(X3) in aggregation, so that the die (1A) may be fit secured within the padding (A) and the frontal wall portion of the padding (A), on the whole, may be applied a sufficient pressure from the die (1A) and pressed evenly against the lower die (4).

In operation, the covering member (B) is turned upside down and placed upon the lower die (4). Next, an operator takes up the padding (A) and folds upwardly a part of its upper rearward wall portion (11A) between the two slits (Y)(Y), as indicated by the arrow in FIG. 2, to open the upper hollow area (X1), thereby enlarging the opening (O) lengthwise of the padding (A). Then, the operator can easily let the upper die (1A) inserted into the hollow portions (X1)(X2)(X3) by stretching upwardly other remaining rearward wall portions (11B)(11C). In that way, the padding (A) is secured to the upper die (1A) as shown in FIG. 2. It is noted that the thus-upwardly-folded part of the upper rearward wall portion (11A) between the two slits (Y)(Y) is, of course, naturally returned to the ordinary horizontal plane, as in FIG. 1, in registry with other wall portions (11B)(11C) by virtue of elastic recovery nature of the foam padding (A) per se. Then, a proper adhesive (AD) is applied to the frontal surface (10) of padding (A), and by operation of the cylinder (6), the upper die (A) is lowered towards the lower die (4) as shown in FIG. 2 so that the padding (A) is pressed and bonded to the reverse side of the covering member (B) on the lower die (4). After completion of the pressure boding operation, the upper die (1A) is raised by further operation of the cylinder (6) away from the lower die (4) and the operator again folds upwardly the same part of the upper padding wall portion (11A) to forcingly remove the padding (A) from the upper die (1A).

However, the above-described conventional padding (A) and bonding operation by use of the conventional pressing die (1A) has been found defective in that the two slits (Y)(Y) create undesired irregular or uneven points on the flat plane of corresponding upper rearward wall portion (11A), which results in forming an unpleasant non-uniform point, possibly objectionable creases, on the evenly stretched surface of covering member (B) bonded over the padding (A) and leaving an aesthetically poor problem on the outer appearance of the resultant seat. Furthermore, it is difficult on the part of operator to quickly insert the upper die (1A) into the hollow portions of the padding (1A) because of such troublesome need for folding up the cut area of padding between the two slits (Y)(Y) in question. Moreover, the given plate-like upper die (1A) limits its use to a particular padding having a length of inner hollow portion substantially equal to the length of upper die (1A), hence making it difficult to adapt the die (1A) for use of another different padding having different hollow length, in which case, it is also difficult to precisely position the padding (A) on the upper die (1A) with respect to the lower die (4).

SUMMARY OF THE INVENTION

In view of the above-stated drawbacks, it is therefore a primary purpose of the present present invention to provide an improved die for bonding a padding to a covering member for a vehicle seat, which permits for pressingly bonding a padding with no slits formed therein to a covering member.

In order to achieve such purpose, in accordance with the present invention, there is provided a die for pressingly bonding a foam padding to a covering member to assemble a vehicle seat, the foam padding being of a one-side-opened type having an inner wall and a hollow area formed therein, which comprises:

a first die means to which the foam padding is secured; and a second die means on which the covering member is placed;

the first die means including:

(a) a main die portion for pressing a part of the inner wall of the foam padding excepting the hollow area, against the covering member placed on the second die means; and (b) a movable die member connected hingedly to the main die portion such as to be movable towards a direction wherein the main die portion is pressed against the part of the inner wall of the foam padding;

wherein when the foam padding is secured to the first die means, the movable die member is inserted into the hollow area, and when the first die means is operated towards the second die means to press the foam padding agains the covering member, the movable die member is moved within the foam padding towards a position on same horizontal line with the main die portion.

Accordingly, such movability of the movable die member allows easy insertion of the first die means into within the foam padding without necessity for forming slits in the the padding, and further allows horizontal flat formation of the first means within the padding so as to uniformly press the foam padding against the covering member on the second die means for effective bonding. In addition, the movability of the movable die member makes easy and smooth the securement and removal of the padding to and from the first die means.

Preferably, the first and second die means may be an upper die and a lower die, respectively, and the movable die member may be normally inclined in a downward direction due to gravity in relation to the main die portion in main die portion in cooperation with a stopper means which limits a downward inclination angle of the movable die member relative to the main die portion.

It is a second purpose of the invention to allow the first die means to be set and retained within the foam padding at a predetermined position, regardless of a slight difference in length between the first die means and foam padding or its hollow area, with a view to assuring to locate the padding at a given position with regard to the covering member on the second die means.

To this end, the foam padding may be formed with a through-opening which communicates with the hollow area and inner wall of the padding, and a projection means may be provided at the first die means, which projects outwardly from the latter and is adapted to be inserted in the through-opening of the foam padding. Thus, even if the first die means is relatively smaller in length than the foam padding or the hollow area of same, or even if the foam padding or its hollow area is relatively greater in length than the first die means, the projection means remains inserted in the through-opening, which keeps the first die means located at a given position within the padding, which in turn insures to set and retain a given position of the padding with regard to the covering member placed on the second die means.

All another features and advantages of the present invention will become apparent from reading of the descriptions hereinafter with reference to the drawings.

DETAILED DESCRIPTION OF PREFERRED EMBODIMENT OF THE INVENTION

Referring to FIGS. 3 through 7, there is illustrated one preferred embodiment of pressingly bonding die and operations in the present invention.

Figure 3:
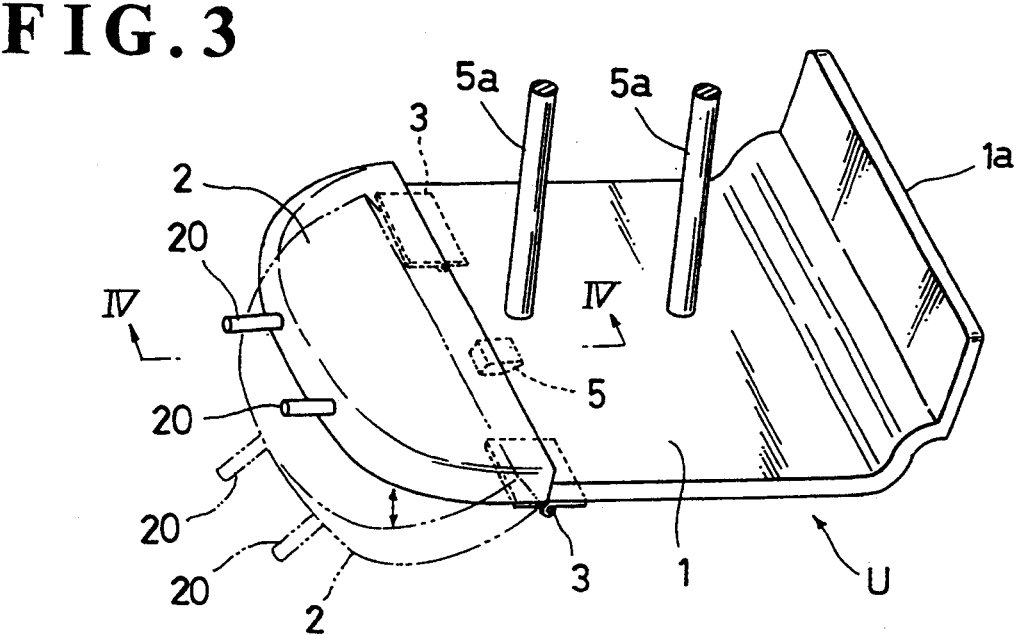
FIG. 3 is a partly broken, schematic perspective view of an upper die with a movable die member in accordance with the present invention.
Figure 4:
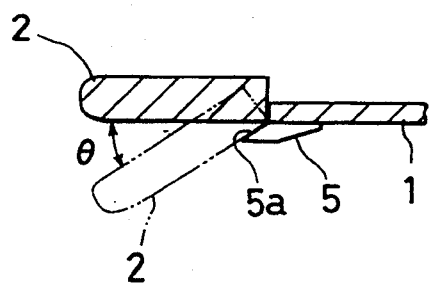
FIG. 4 is a partially sectional view taken along the line IV—IV in the FIG. 3.
Figure 7:
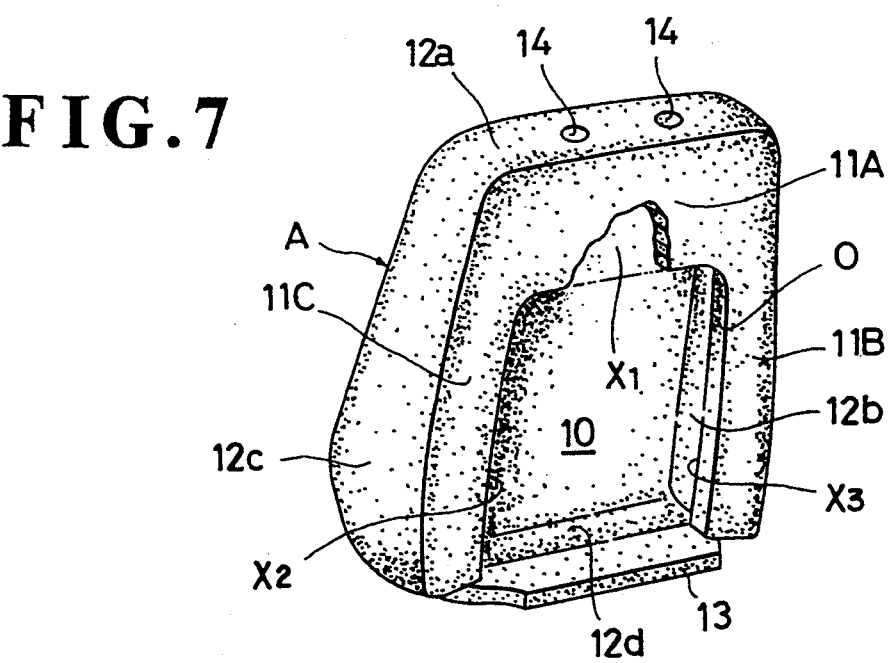
FIG. 7 is a schematic perspective view of the foam padding to be subject to the pressingly bonding process in accordance with the present invention.

As shown in FIGS. 3 and 4, in accordance with the invention, there is provided a pressing upper die (U) that comprises a main die portion (1) formed from a metallic plate material, a vertically movable die member (2) connected pivotally via two hinges (3)(3) to the forward end of the main die portion (1), and an upstanding rearward die portion extending continuous and upwardly from the rearward end of main die portion (1). This upper die (U) is connected via two rods (5a)(5a) to a known hydraulic cylinder (6) same with the one stated in the prior art description above, and may be worked in combination with the lower die (4) which has been described in the prior art description. Therefore, similarly, operation of the cylinder (6) causes the upper die (U) to move towards or away from the lower die (4) for the same pressure bonding purpose.

The illustrated foldable die member (2) is formed greater in thickness than the main die portion (1), and so hinged at (3) as to be vertically rotatable between a horizontal use state as indicated by the solid line and a downwardly inclined insertion state as indicated by the two-dot chain line, in both FIGS. 3 and 4. Designation (5) stands for a stopper having a sloped surface (5a) which acts as a limit against the downward inclination of the foldable die member (2).

When located in the horizontal use state, the movable die member (2) lies on the same horizontal line with the longitudinal axis of the main die portion (1), because those two die elements (1)(2) are so hinged together by the two hinges (3)(3) that their respective reverse sides are in registry with each other as best understandable from FIG. 4, which causes the rearward end of the foldable die member (2) to be abutted against the forward end of the main die portion (1). Therefore, in this instance, the forward end of main die portion (1) serves to limit the upward rotation of the movable die member (2) and retain the same horizontally on the same longitudinal axis of the main die portion (1).

On the other hand, when in the downwardly inclined insertion state, the movable die member (2) is downwardly inclined from the forward end of main die portion (1) and retained its inclination angle by means of the foregoing stopper (5), which serves the purpose for letting the lower die (U) per se inserted easily into a padding (A) as will be described in detail later. Preferably, the sloped surface (5a) of the stopper (5) should be formed to have a downwardly inclination angle at about 30 to 45 degrees relative to the longitudinal axis of the main die portion (1), so as to properly set the downward inclination angle range (θ) of the movable die member (2).

Figure 6:
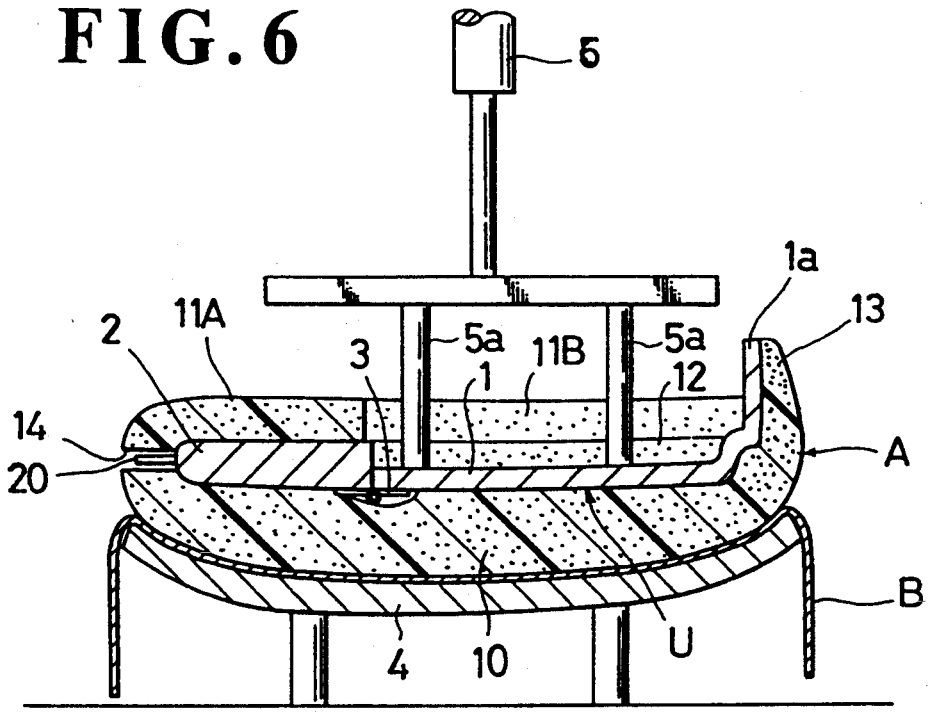
FIG. 6 is a schematic sectional view which shows the foam padding secured on the upper die as being pressingly bonded to the covering member placed on the lower die.

FIG. 6 shows a foam padding (A) to be secured on the above-described upper die (U). In accordance with the present invention, directly employed as the padding, is the same structure of padding (A) explained previously in the prior art description, since the present invention is based on the particular padding (A) of one-side-opened and hollow type shown in FIGS. 1 and 2. However, the padding (A) illustrated in FIG. 6 is not formed with the two slits (Y)(Y) found in the prior-art padding (A). For the sake of simplicity in description, it should be understood that further detailed description is omitted with regard to the padding (A) and that all like designations to be given hereinafter correspond to all like designations in the previous prior art description and the relevant FIGS. 1 and 2. The same goes for the lower die (4) and covering member (B) since they are normally required in the pressure bonding process for assembling a vehicle seat.

Figure 1:
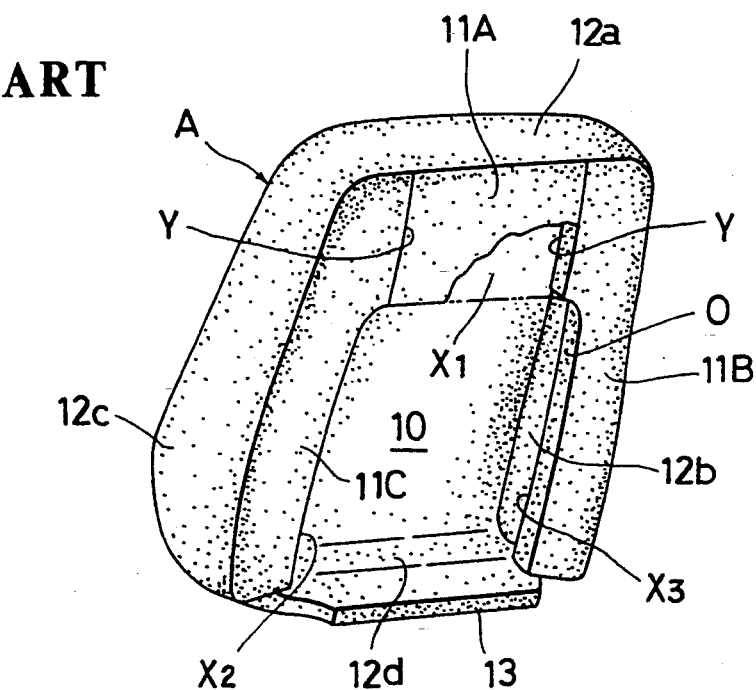
FIG. 1 is a schematic perspective view of a conventional foam padding.
Figure 2:
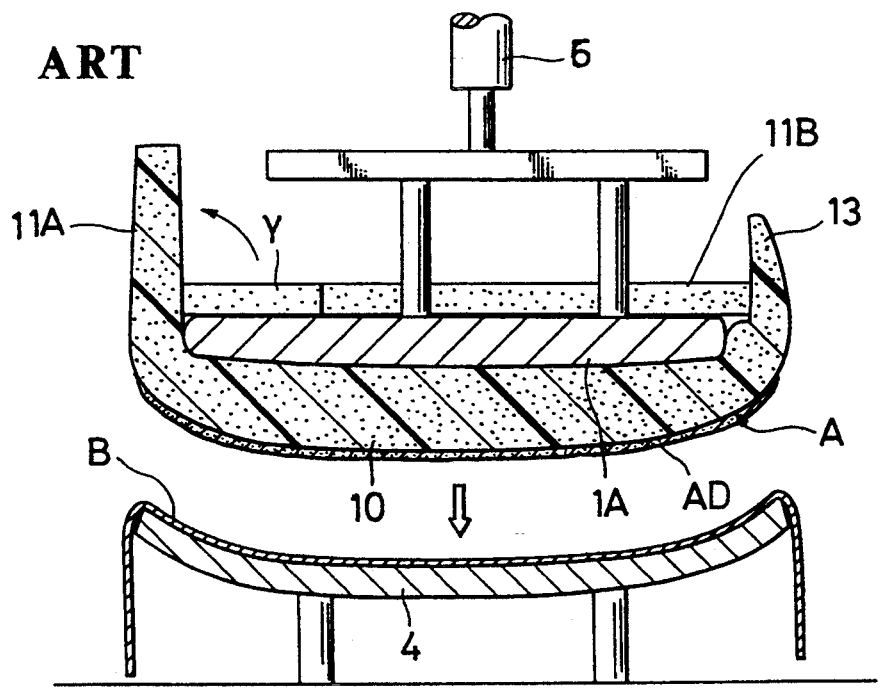
FIG. 2 is a schematic sectional view which shows explanatorily a process for pressingly bonding the conventional foam padding to a covering member, using a conventional pressing die assembly.

Basically, in operation, as similar to the conventional pressure bonding process as in FIGS. 1 and 2, the covering member (B) is turned upside down and placed on the lower die (B), and the padding (A) is secured to the upper die (U). But, at this step, as understandable from FIG. 4, prior to securing the padding (A) to the upper die (U), the movable die member (2), by reason of its weight and gravity exerted thereon, is normally inclined downwards relative to the hinge point at (3) and retained as it is by the stopper (5). Hence, the forward portion of the upper die (U) corresponding to the movable die member (2) presents a sloped area extending in a downwardly slant manner from the main die portion (1). Then, an operator firstly secures, with his or her hands, the upper part of the padding (A) to such downwardly inclined die member (2) by letting that die member (2) inserted into the upper hollow area (X1) of padding (A), and continuously secures the remaining lower part of padding (A) to the main die portion (1) by letting both lateral sides of that main die portion (1) inserted into the two lateral hollow areas (X2)(X3), respectively. As a result, the substantial body of padding (A) is secured to the upper die (A) in a manner depending therefrom, as shown in FIG. 4. In this respect, it is appreciated that the downwardly inclined state of movable die member (2) permits the die member (2) itself to be easily and smoothly inserted into the upper hollow area (X1) of padding (A), thus facilitating the ease with which the upper part of padding (A) can be secured to the die member (2) and continuously allowing easy insertion of both lateral sides of main die portion (1) into the respective two lateral hollow areas (X2)(X3). For this reason, there is no need to form such slits (Y)(Y) or the like in the padding (A) in the the prior art. To make such insertion advantages more effective, it is preferable, as noted above, that the sloped surface (5a) of stopper (5) be formed to have a downwardly inclination angle within 30 to 45 degrees in relation to the main die portion (1).

Thereafter, an adhesive (AD) is applied to the surface of the padding (A), and with the cylinder (6) operated, the upper die (U) with the padding (A) secured thereto is caused to move downwardly in a direction towards the lower die (4) on which the covering member (4) is placed.

Figure 5:
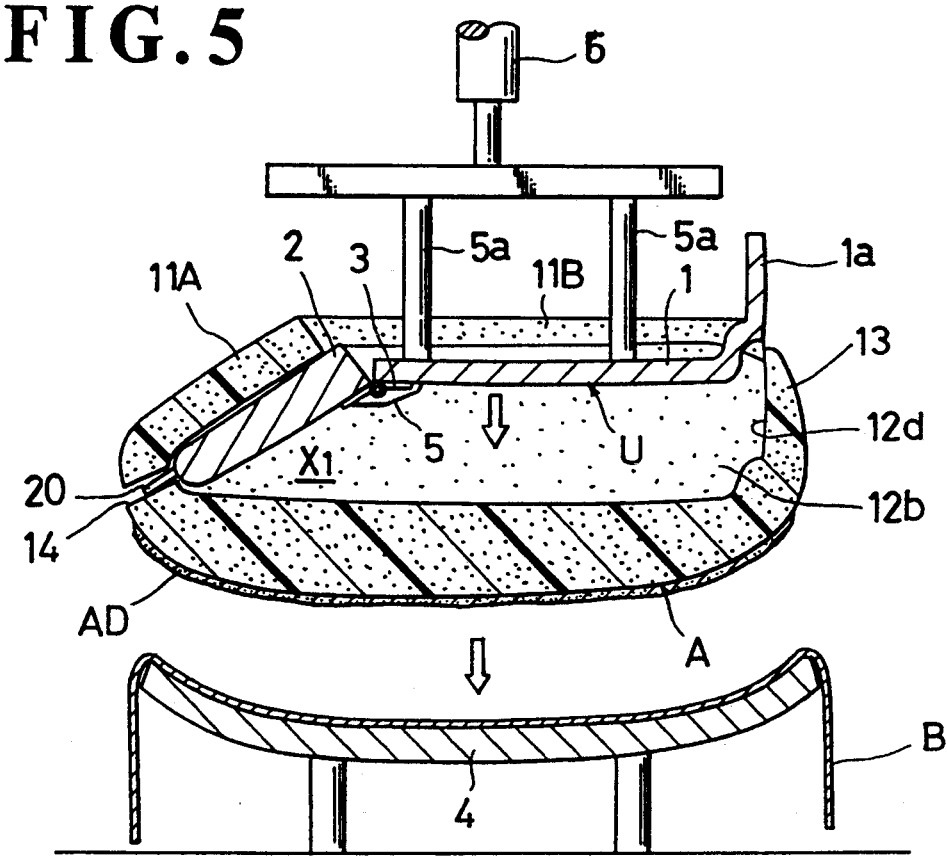
FIG. 5 is a schematic sectional view which shows explanatorily a process for pressingly bonding a foam padding against a covering member placed on a lower die, using such upper die with movable die member, in accordance with the present invention.

Then, as shown in FIG. 5, the padding (A) is pressed against and bonded to the reverse side of covering member (4), with the movable die member (2) being rotated upwardly to a position on the same horizontal line with the main die portion (1), and with the rearward upstanding portion (1a) being fitted in the bendable wall portion (13) of padding (A), whereupon the upper die (U) is made flat and bodily inserted within the whole hollow of the padding (A), acting to impart the downwardly pressing force upon most of areas of the frontal wall portion (10). By being so evenly given the pressure, the surface of the padding (A) is completely bonded to the corresponding areas of the covering member (B).

The above-constructed upper die (U) may preferably be formed in a dimensions substantially equal to the inner area of the padding frontal wall portion (10), and also, the movable die member (2) may preferably have a dimensions substantially equal to the volume of the upper hollow area (X1) of padding (A). But, referring to FIGS. 3(A), 4 and 6, it may be arranged such that a pair of spaced-apart through-holes (14)(14) are perforated through the upper wall portion (12a) of padding (A) in an opening communication with the upper hollow area (X1) thereof, and a pair of spaced-apart projected rods (20)(20) are formed at or fixed to the foremost end portion of movable die member (2), the rods (20)(20) being each of a length generally equal to that of those through-holes (14). In the case of this embodiment, when securing the foam padding (A) to the upper die (U), the two projected rods (20)(20) are respectively inserted into the two through-holes as shown in FIG. 5. Hence, even if the upper die (U) is relatively smaller in length than the padding (A) or the hollow areas (X1)(X2)(X3) of the same, or even if the padding (A) or its hollow areas (X1)(X2)(X3) is relatively greater in length that the upper die (U), the projected rods (20)(20) still remain inserted in the respective through-holes (14)(14), thereby keeping the upper die (U) located at a given position within the padding (A), which in turn insures to set and retain a given position of the padding (A) with regard to the covering member (B) placed on the lower die (4). This eliminates the needs for preparing several different lengths of upper dies matching to different lengths of paddings. Of course, the conditions in this respect is that the length of padding or its hollow areas must be such as to avoid falling off of the upper die projected rods (20) from the respective through-holes (14) thereof.

After completion of the foregoing pressure bonding between the upper and lower dies (U)(4), the bonded unit of padding (A) and covering member (B) is secured to the lower die (4) by means of a suitable securing member (not shown) provided at the lower die (4), and then when the upper die (U) is raised from the lower one (4) by operation of the cylinder (5), the movable die member (2) is again rotated downwardly relative to the hinge point at (3) due to gravity and returned to the downwardly inclined state indicated by the solid line in FIG. 4, as a result of which, the die member (2) presents a downwardly inclined surface in the upper die (U). This inclined surface now makes easy and smooth the disengagement or removal of the movable die member (2) from the upper hollow area (X1) of padding (A), while at the same time, both lateral sides of the main die portion (1) are displaced upwardly, causing elastic upturning of the corresponding right and left rearward wall portions (11B)(11C) of padding (A), and smoothly removed from the respective right and left hollow portions (X3)(X2). In this way, the entirety of upper die (A) is removed from the padding (A) bonded to the covering member (B). At this step, of course, the bonded unit of padding and covering member may be retained manually by the hands of operator to the lower die (4).

From the descriptions above, it will be appreciated that the provision of the vertically movable die member (2) in the upper die (U) eliminates the necessity to form such two slits (Y)(Y) in the back side of padding (A) as found in the prior art and allows easy insertion and removal of the upper die (U) into and from the padding (A). Accordingly, there is no problem of objectionable uneven points on the surface of resultant seat in the prior art. With regard to the through-holes (14)(14), they may be replaced by a preformed headrest-stay through-hole(s) that is found in most of paddings for vehicle seats with headrest, in which case, there is no necessity to especially form the through-holes (14)(14) in the padding (A).

While having described the present invention thus far, it should be understood that the invention is not limited to the illustrated embodiments, but any other modifications, replacements and additions may be applied thereto structurally without departing from the scopes of the appended claims.

What is claimed is:

1. A die for pressingly bonding a foam padding to a covering member to assemble a vehicle seat, the foam padding having an opening on one side comprising an inner wall and a hollow area formed therein, said die comprising:
    a first die means to which said foam padding is secured; and
    a second die means on which said covering member is placed;
    said first die means including:
    (a) a main die portion for pressing a part of the inner wall of said foam padding excepting said hollow area, against said coveting member placed on said second die means; and
    (b) a movable die member connected hingedly to said main die portion such as to be movable towards a direction wherein said main die portion is pressed against said part of the inner wall of said foam padding;
    wherein when said foam padding is secured to said first die means, said movable die member is inserted into said hollow area, so that it is completely enclosed by the hollow area and is adjacent to the entire surface area of the foam within the hollow area, and when said first die means is operated towards said second die means to press said foam padding against said coveting member, said movable die member is moved within said foam padding towards a position on same horizontal line with said main die portion.

2. The die as defined in claim 1, wherein said foam padding is formed with a through-opening which communicates with said hollow area and part of said inner wall of the foam padding, and wherein said movable die member of said first die means is provided with a projection means projecting outwardly from the first die means, said projection means being adapted to be inserted in said through-opening of said foam padding.

3. The die as defined in claim 2, wherein said first die means is of small dimensions relative to a volume of both said hollow area and part of said inner wall of said foam padding.

4. The die as defined in claim 1, wherein said first die means is of a shape substantially equal to the entire shape of both said part of the inner wall and said hollow area of said foam padding.

5. The die as defined in claim 1, wherein said main die portion is formed in a shape generally equal to a shape defined in said part of said foam padding inner wall, and wherein said movable die member is of dimensions substantially equal to a volume of said foam padding hollow area.

6. The die as defined in claim 1, wherein a stopper means is provided for limiting a range within which said movable die member is moved towards said direction wherein said main die portion is pressed against said part of said foam padding inner wall.

7. The die as defined in claim 1, wherein said first die means is an upper die and said second die means is a lower die, and wherein said upper die is operable to be moved towards and away from said lower die.

8. The die as defined in claim 1, wherein said movable die member is hingedly connected to one end of said main die portion in such a manner as to be normally inclined in a downward direction due to gravity in relation to said main die portion in cooperation with a stopper means which limits a downward inclination angle of said movable die member relative to said main die portion.

* * * * *